Oct. 6, 1925.
E. LAHIÈRE
1,556,330
NEST AND EGG CHUTE
Filed May 12, 1924
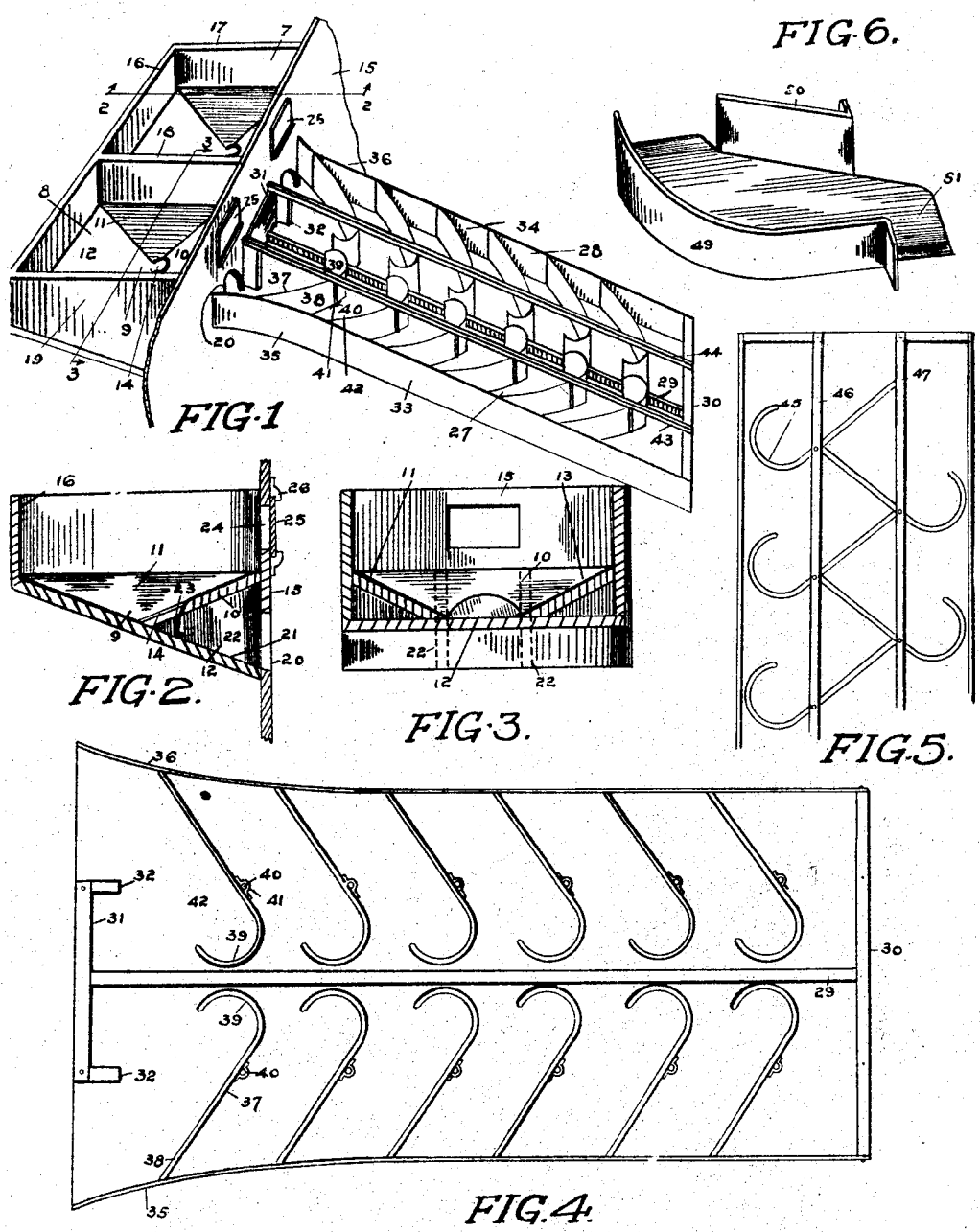
Inventor
E. Lahière
By E.J. Fetherstonhaugh
Attorney Patented Oct. 6, 1925.

1,556,330

UNITED STATES PATENT OFFICE.

EDOUARD LAHIÈRE, OF MONTREAL, QUEBEC, CANADA.

NEST AND EGG CHUTE.

Application filed May 12, 1924. Serial No. 712,707.

*To all whom it may concern:*

Be it known that I, EDOUARD LAHIÈRE, a subject of the King of Great Britain, and residing at the city of Montreal, in the Province of Quebec, in the Dominion of Canada, have invented a new and useful Nest and Egg Chute, of which the following is the specification.

The invention relates to a nest and egg chute as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to eliminate the inconveniences and losses incidental to the soiling or destruction of the eggs, while in the nest, necessitating the cleaning of eggs or nest as the case may be; to economize in labor in large poultry farms; to enable the farmer to accurately estimate the value of his stock individually; to insure despatch and quick deliveries; and generally to provide a systematic and efficient device for the aforesaid purposes.

In the drawings, Figure 1 is a perspective view of the nest and delivery chute.

Figure 2 is a vertical sectional view on the line 2—2 in Figure 1.

Figure 3 is a vertical sectional view on the line 3—3 in Figure 1.

Figure 4 is an enlarged plan view of the chute.

Figure 5 is a plan view of a single nest chute.

Figure 6 is a perspective detail of an elbow for diverting the chute along side the nest.

Like numerals of reference indicate corresponding parts in the various figures.

Referring to the drawings, the nests 7 and 8 are each formed with the hopper bottom 9 having the four sloping boards 10, 11, 12 and 13 converging to the discharge opening 14, the board 12 extending through to the front wall 15 of the nest enclosures, this wall 15 being here shown as parallel with the rear wall 16 and joined intermediately by division or end walls 17, 18 and 19. The precise shape of the nest is not essential to the invention and of course so far as the number of nests are concerned that may be from one to the limit of the requirements; however it is desirable to take the discharge of eggs from the nests in pairs, as more particularly explained hereinafter.

The sides 12 slope down to the outlets 20, in the front wall 15 and the paths 21 to the said outlets are flanked by the walls 22 which guide the eggs to said outlets.

The bottoms 9 are preferably covered with canvas and a flap or curtain 23 hangs down in front of the entrance to each path 21, so as to avoid penetration of light from below.

The observation openings 24 are shown in the front wall 15 above the board 14 of the bottom 9 and these openings are closed by the sliding panes 25 of glass or other transparent material within the frames 26, over which shutters may be arranged if desirable.

The chutes 27 and 28 complete the equipment and these are formed within the one enclosure and divided by the longitudinal partition 29 extending between the end wall 30 and the top wall 31, the latter having the pocket abutments 32 projecting outwardly therefrom at its extremities. The side walls 33 and 34 of the chutes flare at their upper ends 35 and 36 to effectively guide the eggs to the pockets.

The egg pockets 37 are preferably formed of sheet metal and have the straight stems 38 normally leaning against the side walls 33 and 34 and the hooked ends 39 adjacent to the division wall 29 until filled, each stem having the pivot shaft 40 rigidly secured thereto towards the hooked end 39. These pivot shafts 40 extend into countersunk bearings 41 in the floor 42 of the chutes and at their upper ends are journalled in the bars 43 and 44 secured to the end wall 30 and abutments 32.

The chutes 27 and 28 are arranged respectively under the nest openings of adjoining nests and secured in any suitable way respectively or otherwise to the front wall 15 and at the end rest on the floor or shelf or other suitable support and form inclined ways for the eggs from the nests the eggs being stopped and caught by the pockets in succession.

In a single chute as illustrated in Figure 5 the pockets 45, of precisely the same shape, are pivoted consecutively in parallel pivot bars 46 and 47 respectively, and one path from the nest opening furnishes the way to the pockets on both sides.

In Figure 6 the elbow illustrated is formed with a deflecting wall 49 and guard wall 50 by means of which the egg is directed into a chute set alongside the front wall of the nest which is secured under the projecting floor plate 51 of the elbow.

In the use of this device, the action is entirely automatic and as soon as the egg is laid by the hen it runs out through the opening in the bottom of the nest past the curtain to the outlet where it continues rolling until it strikes the stem of the first pocket and is deflected by said stem into the hooked pocket end. This overbalances the stem end and turns the pocket on its pivot and sends the stem up against the top abutment. The next egg naturally rolls to the next pocket and the stem of the second pocket in its filled state overlaps the first pocket folds up thereagainst and so on until the last pocket is filled.

What I claim is:—

1. In a nest and egg chute, a chute adapted to be secured to the nest at the outlet and inclined therefrom and forming a path for the eggs and egg pockets of sheet material having hooked stems leaning against the side wall of the chute and forming pockets and pivoted at the inner side of said path and overlapping in their closed positions.

2. In a nest and egg chute, a double chute forming two egg paths and adapted to be secured to the front wall of adjoining nests at their outlet openings and having side walls, an end wall and a partition wall, bars forming upper pivot bearings, in alignment with lower pivot bearings, and egg pockets of sheet material having stems and hooked ends and pivot shafts journalled in said bearings.

Signed at Montreal, Canada, this 16th day of April, 1924.

EDOUARD LAHIÈRE.